US012552683B2

(12) United States Patent
Takata et al.

(10) Patent No.: US 12,552,683 B2
(45) Date of Patent: Feb. 17, 2026

(54) TRANSITION METAL OXIDE PARTICLES COATED WITH AN AMORPHOUS LITHIUM-CONTAINING POWDER AND THE USE THEREOF IN ENERGY-STORAGE DEVICES

(71) Applicant: Evonik Operations GmbH, Essen (DE)

(72) Inventors: Ryo Takata, Tokyo (JP); Franz Schmidt, Gross-Gerau (DE); Sven Müller, Bonn (DE); Christian Panz, Wesseling-Berzdorf (DE); Daniel Esken, Erlensee (DE); Marcel Herzog, Karlstein (DE)

(73) Assignee: Evonik Operations GmbH, Essen (DE)

( * ) Notice: Subject to any disclaimer, the term of this patent is extended or adjusted under 35 U.S.C. 154(b) by 525 days.

(21) Appl. No.: 18/122,709

(22) Filed: Mar. 17, 2023

(65) Prior Publication Data
US 2023/0303406 A1 Sep. 28, 2023

(30) Foreign Application Priority Data
Mar. 23, 2022 (EP) .................................... 22163798

(51) Int. Cl.
*C01G 53/44* (2025.01)
*C01G 53/82* (2025.01)
*H01M 10/0525* (2010.01)
*H01M 10/0562* (2010.01)

(52) U.S. Cl.
CPC ............. *C01G 53/44* (2013.01); *C01G 53/82* (2025.01); *H01M 10/0525* (2013.01); *H01M 10/0562* (2013.01); *C01P 2006/12* (2013.01); *C01P 2006/40* (2013.01); *H01M 2300/0071* (2013.01)

(58) Field of Classification Search
None
See application file for complete search history.

(56) References Cited

U.S. PATENT DOCUMENTS

| 7,749,322 | B2 | 7/2010 | Schmacher et al. |
| 7,993,782 | B2 | 8/2011 | Takada et al. |
| 2018/0219219 | A1 | 8/2018 | Ito et al. |
| 2020/0010367 | A1 | 1/2020 | Esken et al. |

(Continued)

FOREIGN PATENT DOCUMENTS

| DE | 41 02 328 | 7/1992 |
| EP | 3 971 139 | 3/2022 |

OTHER PUBLICATIONS

European Search Report and Search Opinion for corresponding EP 22 16 3798 completed Sep. 1, 2022.

(Continued)

*Primary Examiner* — Colin W. Slifka
(74) *Attorney, Agent, or Firm* — Law Office of: Michael A. Sanzo, LLC

(57) ABSTRACT

The present invention relates to a method for making a transition metal oxide coated with an at least partially amorphous lithium-containing coating and a method for making an at least partially amorphous lithium-containing powder as well as the coated transition metal oxide and the lithium-containing powder obtainable by these methods. The present invention further relates to an electrode, electrolyte, or energy-storage device, such as a lithium-ion solid-state battery, comprising the coated transition metal oxide.

20 Claims, 2 Drawing Sheets

(56) References Cited

U.S. PATENT DOCUMENTS

| | | |
|---|---|---|
| 2020/0194788 A1 | 6/2020 | Mitsumoto et al. |
| 2020/0306486 A1 | 10/2020 | Oddo et al. |
| 2022/0013774 A1 | 1/2022 | Shin et al. |
| 2022/0149368 A1 | 5/2022 | Herzog et al. |
| 2022/0289589 A1 | 9/2022 | Esken et al. |
| 2022/0367856 A1 | 11/2022 | Woo et al. |
| 2022/0411282 A1 | 12/2022 | Choi et al. |

OTHER PUBLICATIONS

U.S. Appl. No. 17/638,552, filed Aug. 26, 2020, US-2022/0289589 A1, Sep. 15, 2022, Esken.
U.S. Appl. No. 17/638,549, filed Aug. 26, 2020, US-2020/0306486, Sep. 29, 2022, Esken.
European Search Report and Search Opinion for corresponding EP 23 16 1643 completed Jul. 14, 2023.

TRANSITION METAL OXIDE PARTICLES COATED WITH AN AMORPHOUS LITHIUM-CONTAINING POWDER AND THE USE THEREOF IN ENERGY-STORAGE DEVICES

CROSS REFERENCE TO RELATED APPLICATIONS

The present application claims priority under 35 USC § 119 to European application EP 22163798.6, filed on Mar. 23, 2022, the contents of which is incorporated herein by reference in its entirety.

FIELD OF THE INVENTION

The present invention relates to a method for making a transition metal oxide coated with an at least partially amorphous lithium-containing coating and a method for making an at least partially amorphous lithium-containing powder as well as the coated transition metal oxide and the lithium-containing powder obtainable by these methods. The present invention further relates to an electrode, electrolyte, or energy-storage device, such as a lithium-ion battery, comprising the coated transition metal oxide.

BACKGROUND OF THE INVENTION

Secondary lithium ion batteries are one of the most important battery types currently used. The secondary lithium ion batteries are typically composed of an anode made of a carbon material or a lithium-metal alloy, a cathode made of a lithium-metal oxide (mixed transition metal oxide), an electrolyte in which a lithium salt is dissolved in an organic solvent and a separator providing the passage of lithium ions between the positive and the negative electrode during the charging and the discharging processes.

A major problem with cathode active materials (CAMs) is the aging and thus the loss of performance during cycling. This phenomenon is especially relevant for CAMs with a high nickel-content. During cycling the CAM suffers from several electrochemical degradation mechanisms, resulting in a decrease of capacity, performance and cycle life.

Surface coating has proven to be an extremely important method to address this aging problem of CAMs by suppressing the direct contact between the active materials surfaces and the electrolyte.

In endeavor to develop secondary batteries with improved intrinsic safety and energy density, the use of solid electrolytes instead of liquid electrolytes has considerably progressed in the recent time. Among such systems, secondary lithium batteries with electrodes made of lithium metal or lithium metal alloys are believed to provide high energy density and be particularly suitable. Such all-solid-state secondary lithium-ion batteries should have high ionic conductivity at an interface between an electrode active material and an electrolyte. This high ionic conductivity can be improved by coating the surface of an active electrode material by certain lithium-comprising compounds, such as $LiNbO_3$, $LiTaO_3$, $Li_2ZrO_3$, as described in JP 4982866 B2 or JP 2018106974 A. Such coated cathode active materials are typically formed by wet coating of an alkoxide solution containing lithium, titanium, aluminum, niobium, tantalum, and/or zirconium on cathode active material particle surfaces and calcining the thus obtained mixture at a temperature of 200-600° C.

WO 2020/256358 discloses a positive active material for a lithium secondary battery that comprises a lithium composite metal oxide and a coating layer located on the core and including an amorphous phase that includes a mixture of lithium oxide and tungsten oxide.

US 2022/013774 discloses a cathode active material for a lithium secondary battery comprising a core containing lithium composite metal oxide and a coating layer disposed on the core, containing a mixture of lithium oxide, tungsten oxide, boron oxide and phosphorus oxide, and having an amorphous phase. In example 1, powders are dry mixed. Lithium oxide was produced by oxidation of lithium by products remaining on the surface of the lithium composite metal oxide.

US 2020/194788 discloses a positive electrode active substance for an all solid state lithium secondary battery, wherein a surface of core particles composed of a spinel-type lithium manganese-containing composite oxide containing at least Li, Mn, O, and two or more elements other than Li, Mn, and O, is coated with an amorphous compound containing Li and A, where A represents one or a combination of two or more elements selected from the group consisting of Ti, Zr, Ta, Nb, Zn, W, and Al, and O. The raw materials for the core can be mixed e.g. by dry mixing, however, the surface coating process is solution-based.

JP 4 982866 discloses lithium transition metal oxide as a positive electrode active material for an all-solid lithium battery. The surface of the positive electrode active material is coated with a lithium ion conductive oxide having substantially no electron conductivity. The coating layer is heat-treated at a low temperature, it is usually in an amorphous state. Suitable lithium ion conductive oxides for use for the coating layer include niobium or tantalum or both, and lithium.

A method for preparing encapsulated mixed transition metal oxide particles by dry mixing of transition metal oxides with a mixture of pyrogenically produced aluminum oxide and titanium dioxide is disclosed in WO 2018/149834 A1. The encapsulated mixed transition metal oxide particles positively affect the long-term cycling stability of the electrodes. However, deterioration of lithium-ion diffusion in solid-state batteries has sometimes been observed due to a reduced ionic conductivity of the coating materials, such as aluminum oxide or titanium oxide.

A method of coating transition metal oxide particles by dry-mixing such particles with preformed calcinated crystalline lithium aluminate or lithium titanate has been described in EP 20206870.6 and a method for producing calcinated alpha lithium aluminate has been described in EP 20197533.1.

SUMMARY OF THE INVENTION

Until now, it has been commonly assumed that the material for coating transition metal oxides used e.g., as cathode material, are applied with very laborious wet coating or Atomic Layer Deposition (ALD) coating methods with subsequent calcination and thereby converted into a crystalline solid in order to obtain an effective material. There still remains a need for providing transition metal oxides as cathode material in an efficient manner in order to improve the electrochemical performance of energy-storage devices, such as cycling performance or discharge capacity.

This object has been solved by the methods, the coated transition metal oxide and the energy-storage device of the present invention, as defined in the appended claims.

It has surprisingly been found that transition metal oxides coated with an at least partially amorphous coating comprising lithium and an oxide of a metal other than lithium, selected from the group consisting of niobium, aluminum, titanium, zirconium, silicon, tungsten, and mixtures thereof, can be produced by simple dry-mixing and that the coated transition metal oxides thus obtained can improve the cycling performance and discharge capacity of energy-storage devices, such as lithium-ion batteries.

Accordingly, the present invention relates to a method for making a transition metal oxide coated with an at least partially amorphous lithium-containing coating, comprising the step of dry mixing a transition metal oxide with an at least partially amorphous powder comprising lithium and an oxide of a metal other than lithium selected from the group consisting of niobium, aluminum, titanium, zirconium, silicon, tungsten, and mixtures thereof.

DETAILED DESCRIPTION OF THE INVENTION

Figure 1:
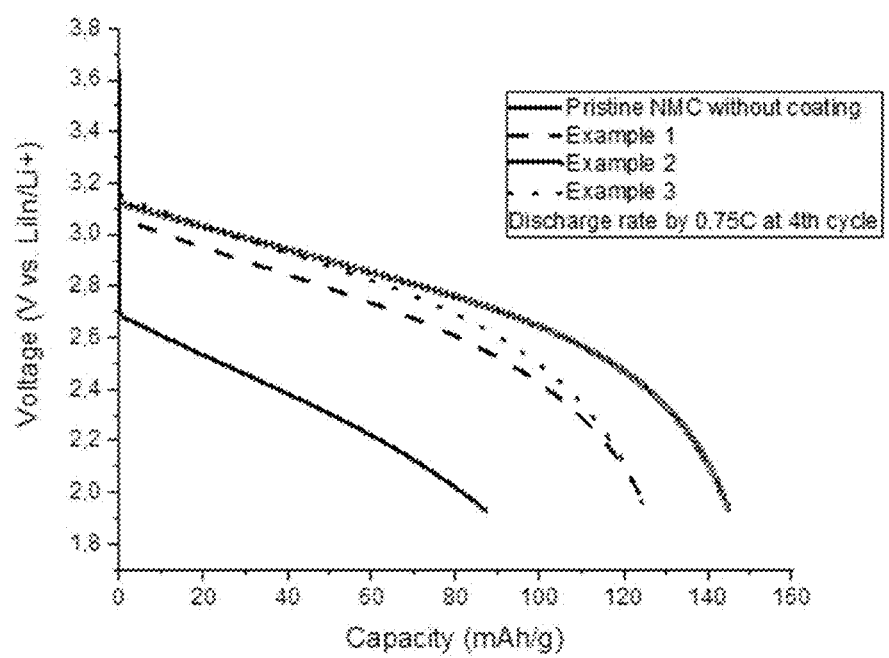
FIG. 1 shows the discharge curves (voltage over capacity) at the 4th cycle at a discharge current of 1.4 mA (0.75C) for niobium-based coating materials in sulfide-based all-solid-state batteries with a solid electrolyte of Li6PS5Cl.

According to the present invention, the term "dry mixing" relates to a step of mixing wherein no liquid is added or used during the process, i.e., substantially dry powders are mixed with each other. However, it is possible that trace amounts of moisture or some liquids other than water are present in the feedstock materials and/or these materials may include crystallization water. Preferably, the mixture of the transition metal oxide and the at least partially amorphous lithium-containing powder contains less than 5 wt.-%, preferably less than 3 wt.-%, more preferably less than 1 wt.-% of water and/or any other substance liquid at room temperature (23° C.) and atmospheric pressure (1013 mbar).

Dry mixing according to the present invention may be carried out by means of an electric mixing unit having a specific electrical power of 0.05 kW to 1.5 kW per kg of the transition metal oxide. As used herein, the term "electric mixing unit" relates to any mixing device operated by supply of electric energy.

Electrical power is the rate, per unit time, at which electrical energy is transferred by an electric circuit. As used herein, the term "specific electrical power" relates to the electrical power, supplied by the electrical mixing unit during the mixing step, per kg of the transition metal oxide. The specific electrical power may be in the range of from 0.05 to 1.5 kW per kg of the transition metal oxide.

The nominal electrical power of the mixing unit according to the present invention may range from 0.1 kW to 1000 kW. Thus, it is possible to use mixing units on the laboratory scale with a nominal power of 0.1 kW to 5 kW or mixing units for the production scale with a nominal electrical power of 10 kW to 1000 kW. The nominal electrical power is the nameplate, maximal absolute electrical power of the mixing unit.

The volume of the mixing unit according to the present invention is not particularly limited and may range, for instance, of from 0.1 L to 2.5 m$^3$. Thus, it is possible to use mixing units on the laboratory scale with a volume of 0.1 L to 10 L or mixing units for the production scale with a volume of 0.1 m$^3$ to 2.5 m$^3$. The term "volume of the mixing unit" according to the present invention refers to the maximal volume of the chamber of the electric mixing unit where the substances to be mixed can be placed.

Forced mixers may be used in the form of intensive mixers with high-speed mixing tools. The speed of the mixing tool may range from 5 m/s to 30 m/s, preferably from 10 m/s to 25 m/s. As used herein, the term "mixing tool" refers to any object in the mixing unit, which can be moved, e.g., rotated, shaken etc., and thus mix the contents of the mixing unit. Suitable mixing units according to the present invention may be stirrers of various form. Suitable mixing units that can be used according to the present invention may be commercially available mixing units, such as, but not limited, to Henschel mixers or Elrich mixers.

The mixing time may typically range of from 0.1 to 120 minutes, preferably of from 0.2 to 60 minutes, more preferably of from 0.5 to 10 minutes.

As used herein, the term "transition metal" comprises the following elements: Ti, V, Cr, Mn, Fe, Co, Ni, Cu, Zn, Nb, Mo, Ru, Rh, Pd, Ag, Cd, Ta, W, Re, Os, Ir, Pt, and Au. The transition metal oxide according to the present invention may be selected from oxides of any of these transition metals. Preferably the transition metal may be selected from the group consisting of nickel, cobalt, manganese, and mixtures thereof. Preferably, the transition metal oxide may be selected from the group consisting of cobalt oxides, nickel oxides, manganese oxides, mixed nickel-cobalt oxides, mixed nickel-manganese-cobalt oxides, mixed nickel-manganese oxides, mixed nickel-cobalt-aluminum oxides or mixtures thereof, and more preferably may be a mixed nickel-manganese-cobalt oxide. The transition metal oxide may be a mixed transition metal oxide comprising one or more transition metals and lithium cations, which preferably may be selected from the group consisting of lithium cobalt oxides (LCO), lithium nickel oxides (LNO), lithium manganese oxides (LMO), mixed lithium nickel-cobalt oxides (LNCO), mixed lithium nickel-manganese-cobalt oxides (NMC), mixed lithium nickel-manganese oxides (LNMO), mixed lithium nickel-cobalt-aluminum oxides (NCA) or mixtures thereof, and more preferably may be a mixed lithium nickel-manganese-cobalt oxide (NMC).

As used herein, the term "mixed oxide" refers to a metal oxide having cations of more than one chemical element or cations of a single element in several states of oxidation as well as to compounds of oxygen and two or more other elements, where some or all of the oxygen atoms are covalently bound into oxyanions.

As used herein, the term "at least partially amorphous powder" refers to a powder that is either completely amorph or partially amorph, wherein the term "partially" means that the powder also contains crystalline material. The "at least partially amorphous powder" may have an X-ray powder diffraction (XRPD) peak ratio of the 2θ peak at 5° to any 2θ peak at >15° of at least 1:1, such as 1.5:1, such as 2:1. The peak ratio refers to the ratio of the intensity of the 2θ peak at 5° to each individual 2θ peak at >15° in an XRPD spectrum. XRPD spectra can be measured for instance, with PANalytical Theta/Theta Diffractometer X'Pert MPD Pro (PANalytical, Almelo, Netherlands).

As used herein, the term "lithium-containing" refers to a composition or coating comprising lithium in form of an ion or as part of a compound, such as a lithium salt, or a lithium oxide, etc., but typically not in form of elemental lithium.

According to the present invention the at least partially amorphous powder may comprise lithium carbonate. The at least partially amorphous powder may further comprise a lithium metal oxide, the metal preferably comprising niobium, aluminum, titanium, zirconium, silicon, tungsten, and mixtures thereof.

Preferably the at least partially amorphous powder comprises a lithium metal oxide, wherein the metal is selected from the group consisting of niobium, aluminum, titanium, zirconium, silicon, tungsten, and mixtures thereof, alone or as a mixture with lithium carbonate or lithium hydroxide.

The at least partially amorphous powder may be a short-term dried powder, preferably a spray-dried powder or a spin flash dried powder. More preferably, the at least partially amorphous powder may be a spray-dried powder.

The method according to the present invention may further comprise a subsequent step of sintering the transition metal oxide coated with an at least partially amorphous lithium-containing coating at temperatures between 100 and 900° C., preferably between 150 and 800° C. and more preferably between 200 and 700° C. The sintering time may vary between 10 minutes and 12 hours, preferably between 20 minutes and 10 hours. It is preferred to use 02 atmosphere during the sintering.

The method according to the present invention may further comprise, prior to the step of dry mixing the transition metal oxide and the at least partially amorphous lithium-containing powder, the steps of:

preparing an aqueous dispersion comprising an oxide of a metal other than lithium selected from the group consisting of niobium, aluminum, titanium, zirconium, silicon, tungsten, and mixtures thereof, a water-soluble lithium compound and, optionally, an alkali metal carbonate and/or ammonium carbonate, and short-term drying the dispersion to obtain the at least partially amorphous lithium-containing powder.

In particular, if the water-soluble compound is not lithium carbonate, the dispersion may comprise an alkali metal carbonate and/or ammonium carbonate.

The short-term drying according to the method above is preferably selected from spray drying and spin flash drying, and more preferably is spray drying.

As used herein, the term "aqueous dispersion" refers to a plurality of finely divided solid or liquid particles in a continuous solvent phase, wherein at least 50 wt.-% of the solvent is water, based on the total weight of the solvent in the dispersion.

The present invention further relates to a method for making an at least partially amorphous lithium-containing powder, comprising the steps of:

preparing an aqueous dispersion comprising an oxide of a metal other than lithium selected from the group consisting of niobium, aluminum, titanium, zirconium, silicon, tungsten, and mixtures thereof, a water-soluble lithium compound and, optionally, an alkali metal carbonate and/or ammonium carbonate, and short-term drying the dispersion to obtain the at least partially amorphous lithium-containing powder; wherein neither the dispersion nor the at least partially amorphous powder is subjected to a temperature equal to or above 300° C. for more than 1 min, preferably for more than 30 sec; provided that when the water-soluble lithium compound is lithium hydroxide and ammonium carbonate, but no alkali metal carbonate is added to the dispersion, and the dispersion is dried by spray drying, the metal oxide is not aluminum oxide.

The short-term drying is preferably selected from spray drying and spin flash drying, and more preferably is spray drying.

In the method of making an at least partially amorphous lithium-containing powder according to the present invention, the aqueous dispersion typically comprises a pyrogenically produced oxide of a metal other than lithium selected from the group consisting of niobium, aluminum, titanium, zirconium, silicon, tungsten, and mixtures thereof, a water-soluble lithium compound and, if the water-soluble compound is not lithium carbonate, an alkali metal carbonate and/or ammonium carbonate; and the short-term drying typically is spray drying; provided that when the water-soluble lithium compound is lithium hydroxide and ammonium carbonate, but no alkali metal carbonate is added to the dispersion, the metal oxide is not aluminum oxide.

The dispersion prepared in any of the methods according to the present invention is subjected to short-term drying to evaporate water and other volatiles and to obtain the at least partially amorphous lithium-containing powder.

As used herein, the term "short-term drying" refers to any drying procedure, wherein the drying can be effected in a short time, such as in 1 min, such in 30 sec, such as in 10 sec. Such short-term drying can be effected by contacting the dispersion with a hot drying gas, such as air, for instance in a commercially available spray drying or spin flash drying apparatus. The outlet temperature of the short-term drying process according to the present invention, i.e., the temperature of the drying gas containing the dried particles just before they are separated and collected from the gas stream, may typically range of from 50° C. to 200° C., preferably of from 80° C. to 150° C., and more preferably of from 90° C. to 140° C. The short-term drying according to the present method may preferably be selected from spray drying or spin flash drying. More preferably, the short-term drying is spray drying.

As used herein, the term "spin flash drying" relates to a drying process, wherein a liquid product is dried in a short time, such as in 1 min, such in 30 sec, such as in 10 sec, by introducing air as an intense swirl flow into a cylindrical drying chamber. The outlet temperature of the spin flash drying process according to the present invention typically may range of from 50° C. to 200° C., preferably of from 80° C. to 150° C., and more preferably of from 90° C. to 140° C. Spin flash drying may be carried out in any suitable spin flash drier exemplified by Anhydro Spin Flash® dryer commercially available from SPXFLOW (Charlotte, USA) or Niro SWIRL FLUIDIZER™ commercially available from GEA Group (Dusseldorf, Germany).

As used herein, the term "spray drying" relates to a process of rapidly drying a liquid product feed into a powdered material using heated gas. As used herein, the term "rapidly drying" relates to a drying time of 1 min, such as 30 sec, such as 10 sec or even shorter. Hereby, an atomizer or spray nozzle is used to disperse the liquid or slurry into a controlled drop size spray. The spray nozzle can be a two- or three-component jet nozzle. The spray drying may be carried out in any suitable spray drier, such as a pilot plant spray drier or a laboratory spray dryer exemplified by Buchi T0630 commercially available from Buchi Labortechnik GmbH (Essen, Germany).

The spray drying according to the present invention may be carried out using an inlet air temperature of the spray drier of less than 600° C. and an outlet air temperature of from 50° C. to 200° C., preferably of from 80° C. to 150° C., and more preferably of from 90° C. to 140° C. It is known in the art that the outlet temperature results from all heat and mass exchanges inside a drying chamber and theoretically is the highest temperature to which the dried powder can be heated.

The metal oxide used in any methods according to the present invention may be a pyrogenically produced metal oxide or a precipitated metal oxide. Typically, the metal oxide is pyrogenically produced.

As used herein, the term "pyrogenically produced metal oxide" relates to metal oxides which are directly produced by pyrogenic methods, also known as "fumed" methods, or by further modification of pyrogenically produced precursors. The term "pyrogenically produced", "pyrogenic" and "fumed" are used equivalently in the context of the present invention. The fumed metal oxides may be prepared by means of flame hydrolysis or flame oxidation. This involves oxidizing or hydrolysing of hydrolysable or oxidizable starting materials, generally in a hydrogen/oxygen flame. Starting materials typically used for pyrogenic methods include organic or inorganic substances, such as metal chlorides.

As used herein, the term "precipitated metal oxide" relates to a metal oxide which is produced by a precipitation reaction.

According to the present invention the metal of the metal oxide may be selected from the group consisting of niobium, aluminum, titanium, zirconium, silicon, tungsten, and mixtures thereof. Suitable metal oxides may be niobium(V) oxide ($Nb_2O_5$), aluminum oxide ($Al_2O_3$), titanium(IV) oxide ($TiO_2$), zirconium(IV) oxide ($ZrO_2$), silicon dioxide ($SiO_2$), and tungsten(VI) oxide ($WO_3$).

The amount of metal oxide in the dispersion may range of from 0.5 to 20 wt.-%, preferably of from 1.0 to 10 wt.-%, based on the total weight of the dispersion.

As used herein, the term "total weight of the dispersion" relates to the total mass of the complete dispersion including all solid and liquid ingredients, including the solvent.

According to the present invention, the metal oxide may have a specific surface area of from 10 $m^2/g$ to 500 $m^2/g$, preferably of from 30 $m^2/g$ to 250 $m^2/g$, more preferably of from 50 $m^2/g$ to 200 $m^2/g$. As used herein, the term "specific surface area" refers to the total surface area of a material per unit of mass. The specific surface area can be determined according to DIN 9277:2014 by nitrogen adsorption according to Brunauer-Emmett-Teller (BET) procedure.

As used herein, the term "water-soluble lithium compound" refers to lithium compounds having a solubility in water of at least 0.1 g, preferably at least 1.0 g of the compound in 100 g water at 20° C.

The water-soluble lithium compound may be selected from the group consisting of lithium hydroxide, lithium oxide, lithium carbonate, lithium bicarbonate, lithium oxalate, lithium acetate, lithium formate, lithium nitrate, lithium chloride, lithium bromide, lithium sulfate, lithium perchlorate, and mixtures thereof.

The amount of the water-soluble lithium compound in the dispersion used in the method according to the present invention may range from 0.1 to 10 wt.-%, preferably from 0.5 to 7.5 wt.-%, based on the total weight of the dispersion.

The alkali metal carbonate may be selected from the group consisting of lithium carbonate, lithium bicarbonate, sodium carbonate, sodium bicarbonate, potassium carbonate, potassium bicarbonate, and mixtures thereof. The ammonium carbonate can be a compound with the chemical formula $(NH_4)_2CO_3$ (ammonium carbonate) or $NH_4HCO_3$ (ammonium bicarbonate). The amount of alkali metal carbonate and/or ammonium carbonate, if present in the dispersion, ranges from 0.1 to 10 wt.-%, preferably from 0.5 to 7.5 wt.-%, based on the total weight of the dispersion.

The particles of the at least partially amorphous lithium-containing powder according to the present invention may have a numerical mean particle size $d_{50}$ of not more than 20 μm, preferably ranging of from 1 μm to 15 μm, more preferably of from 2 μm to 10 μm. The numerical mean particle size $d_{50}$ of the particles of the at least partially amorphous lithium-containing powder may be determined by static light scattering (SLS) in the aqueous dispersion according to ISO 13320:2020-01 after treating the aqueous dispersion with ultrasonics for 5 minutes. As used herein, the term "numerical mean particle size" relates to the surface-weighted mean diameter of the particles. The d-value is used in its common meaning, i.e., dx gives the diameter of which x percentage of the particles are smaller.

The particles of the at least partially amorphous lithium-containing powder according to the present invention may have a narrow particle size distribution. The span of the particle size distribution $(d_{50}-d_{10})/d_{50}$ may be not more than 2.5, preferably of from 0.8 to 2.0, more preferably of from 0.9 to 1.5.

The specific surface area of the at least partially amorphous powder may be of from 20 to 300 $m^2/g$, preferably from of 35 to 250 $m^2/g$, more preferably of from 50 to 200 $m^2/g$, and most preferably of from 100 to 200 $m^2/g$, as determined by the BET method. The specific surface area can be determined according to DIN 9277:2014 by nitrogen adsorption according to Brunauer-Emmett-Teller (BET) procedure.

The at least partially amorphous powder may be used in an amount of from 0.1 to 10 wt.-%, preferably of from 0.5 to 5.0 wt.-%, based on the combined weight of the transition metal oxide and the at least partially amorphous powder.

According to the present invention, the single at least partially amorphous powder is not subjected to a temperature equal or above 300° C. before, during, or after the step of short-term drying for more than 1 min, preferably for more than 30 sec. This means that the amorphous powder is at least not subjected to a calcination step before coating on a cathode material.

The present invention further relates to an at least partially amorphous lithium-containing powder, comprising lithium and an oxide of a metal other than lithium selected from the group consisting of niobium, aluminum, titanium, zirconium, silicon, tungsten, and mixtures thereof, made by the method described above.

The present invention further relates to a transition metal oxide coated with an at least partially amorphous lithium-containing coating comprising an oxide of a metal other than lithium selected from the group consisting of niobium, aluminum, titanium, zirconium, silicon, tungsten, and mixtures thereof. The specific surface area of the at least partially amorphous powder ranges of from 10 to 300 $m^2/g$, preferably 20 to 300 $m^2/g$, preferably from of 25 to 250 m²/g, more preferably of from 40 to 200 m²/g, and most preferably of from 50 to 180 m²/g, as determined by the BET method. The transition metal oxide may be selected from the materials already described above and preferably may be selected from the group consisting of lithium cobalt oxides (LCO), lithium nickel oxides (LNO), lithium manganese oxides (LMO), mixed lithium nickel-cobalt oxides (LNCO), mixed lithium nickel-manganese-cobalt oxides (NMC), mixed lithium nickel-manganese oxides (LNMO), mixed lithium nickel-cobalt-aluminum oxides (NCA) or mixtures thereof, and more preferably may be a mixed lithium nickel-manganese-cobalt oxide (NMC).

The coated transition metal oxide according to the present invention may be coated with the at least partially amorphous lithium-containing coating formed from a powder, preferably from the at least partially amorphous lithium-containing powder described above. The coated transition metal oxide may be made by the method according to the present invention.

The present invention further relates to an electrode or an electrolyte comprising the coated transition metal oxide according to the present invention as well as to an energy-storage device comprising the coated transition metal oxide according to the present invention or the electrode or the electrolyte comprising the coated transition metal oxide according to the present invention.

According to the present invention the energy-storage device may be a lithium-containing energy-storage device. It may, for instance, be a battery, a cell, a secondary battery, a battery pack, a pseudocapacitor, a capacitor, or a supercapacitor, such as a lithium-ion battery or battery pack. Preferably, the energy-storage device is a lithium-ion battery.

According to the present invention, the electrode comprising the coated transition metal oxide may be a positive electrode, also known as the cathode, of a lithium-ion battery, typically including a current collector and an active cathode material layer formed on the current collector.

The current collector may be an aluminum foil, a copper foil, a nickel foil, a stainless-steel foil, a titanium foil, a polymer substrate coated with a conductive metal, or a combination thereof, wherein the active cathode material layer comprises the described coated transition metal oxide according to the present invention.

The lithium-ion battery according to the present invention, apart from the cathode, may contain an anode, optionally a separator and an electrolyte comprising a lithium salt or a lithium compound.

The anode of the lithium battery may comprise any suitable material commonly used in the secondary lithium batteries, capable of reversibly intercalating/deintercalating lithium ions. Typical examples thereof are carbonaceous materials including crystalline carbon such as natural or artificial graphite in the form of plate-like, flake, spherical or fibrous type graphite; amorphous carbon, such as soft carbon, hard carbon, mesophase pitch carbide, fired coke and the like, or mixtures thereof. In addition, lithium metal or conversion materials (e.g., Si or Sn) can be used as anode active materials.

According to the present invention, the lithium-ion battery may contain a liquid, gel, polymer, or solid electrolyte.

A liquid mixture of a lithium salt and an organic solvent, which is not cured, polymerized, or cross-linked, is referred to as "liquid electrolyte" in the context of the present invention. A gelled or solid mixture comprising a cured, polymerized, or cross-linked compound or their mixtures, optionally a solvent, and a lithium salt is referred to as a "gel electrolyte" or "polymer electrolyte". Such electrolytes can be prepared by polymerization or cross-linking of a mixture, containing at least one reactive, i.e., polymerizable or cross-linkable, compound and a lithium salt.

A liquid electrolyte of a lithium-ion battery may comprise any suitable organic solvent commonly used in the lithium-ion batteries, such as anhydrous ethylene carbonate (EC), dimethyl carbonate (DMC), propylene carbonate, methyl-ethyl carbonate, diethyl carbonate, gamma butyrolactone, dimethoxyethane, fluoroethylene carbonate, vinylethylene carbonate, or a mixture thereof. The gel electrolytes may include gelled polymers.

The electrolyte of a lithium-ion battery usually contains a lithium salt. Examples of such lithium salts include lithium hexafluorophosphate ($LiPF_6$), lithium bis 2-(trifluoromethylsulfonyl)imide (LiTFSI), lithium bis (fluorosulfonyl) imide (LiFSI), lithium perchlorate ($LiCIO_4$), lithium tetrafluoroborate ($LiBF_4$), $Li_2SiF_6$, lithium triflate, $LiN(SO_2CF_2CF_3)_2$ and mixtures thereof.

According to the present invention, the lithium-ion battery may be one of a solid-state type. As used herein, the term "solid-state type battery" relates to a battery having solid electrodes and a solid electrolyte. Such a battery may comprise various types of solid electrolytes. The solid electrolyte of the lithium battery may comprise oxides, e.g., lithium metal oxides, sulfides, phosphates, or solid polymers.

The battery according to the present invention may be a lithium metal battery, such as Li-air, lithium sulphur (Li—S), and other types of lithium metal batteries. A Li-sulfur (Li—S) battery typically contains an iron disulfide ($FeS_2$), an iron sulfide (FeS), a copper sulfide (CuS), or a lead sulfide and a copper sulfide (PbS+CuS) cathode.

According to the present invention, the lithium-ion battery comprising the coated transition metal oxide may preferably be a sulfide-based solid-state type lithium-ion battery.

The present invention further relates to the use of the previously described coated transition metal oxide for improving the discharge capacity of an energy-storage device in comparison to the same energy-storage device comprising a transition metal oxide coated with a previously calcinated lithium-containing powder.

The following clauses summarizes some aspects of the present invention:

In a first aspect the present invention relates to a method for making a transition metal oxide coated with an at least partially amorphous lithium-containing coating, comprising the step of: dry mixing a transition metal oxide with an at least partially amorphous powder comprising lithium and an oxide of a metal other than lithium selected from the group consisting of niobium, aluminum, titanium, zirconium, silicon, tungsten, and mixtures thereof.

In a second aspect the present invention relates to the method of the first aspect, wherein the transition metal oxide is a mixed transition metal oxide selected from the group consisting of lithium cobalt oxides (LCO), lithium nickel oxides (LNO), lithium manganese oxides (LMO), mixed lithium nickel-cobalt oxides (LNCO), mixed lithium nickel-manganese-cobalt oxides (NMC), mixed lithium nickel-manganese oxides (LNMO), mixed lithium nickel-cobalt-aluminum oxides (NCA) or mixtures thereof, and more preferably is a mixed lithium nickel-manganese-cobalt oxide (NMC).

In a third aspect the present invention relates to the method of the first or second aspect, wherein the at least partially amorphous powder comprises a lithium metal oxide, wherein the metal is selected from the group consisting of niobium, aluminum, titanium, zirconium, silicon, tungsten, and mixtures thereof, alone or as a mixture with lithium carbonate or lithium hydroxide.

In a fourth aspect the present invention relates to the method of any of the preceding aspects, wherein the at least partially amorphous powder further comprises a lithium metal oxide, wherein the metal is selected the group consisting of niobium, aluminum, titanium, zirconium, silicon, tungsten, and mixtures thereof.

In a fifth aspect the present invention relates to the method of any of the preceding aspects, wherein the at least partially amorphous powder is a short-term dried powder, preferably a spray-dried powder or a spin flash dried powder.

In a further aspect of the present invention, the method of any of the preceding aspects, further comprises the subsequent step of sintering the transition metal oxide coated with an at least partially amorphous lithium-containing coating at temperatures between 100 and 900° C.

In a sixth aspect the present invention relates to the method of any of the preceding aspects, further comprising, prior to the step of dry mixing the transition metal oxide and the at least partially amorphous lithium-containing powder, the steps of:
preparing an aqueous dispersion comprising an oxide of a metal other than lithium selected from the group consisting of niobium, aluminum, titanium, zirconium, silicon, tungsten, and mixtures thereof, a water-soluble lithium compound and, optionally, an alkali metal carbonate and/or ammonium carbonate, and
short-term drying the dispersion to obtain the at least partially amorphous lithium-containing powder.

In a seventh aspect the present invention relates to the method of any of the preceding aspects, further comprising, prior to the step of dry mixing the transition metal oxide and the at least partially amorphous lithium containing powder, the steps of:
preparing an aqueous dispersion comprising a pyrogenically produced oxide of a metal other than lithium selected from the group consisting of niobium, aluminum, titanium, zirconium, silicon, tungsten, and mixtures thereof, a water-soluble lithium compound and, if the water-soluble compound is not lithium carbonate, an alkali metal carbonate and/or ammonium carbonate, and
spray drying the dispersion to obtain the at least partially amorphous lithium-containing powder.

In an eighth aspect the present invention relates to a method of making an at least partially amorphous lithium-containing powder, comprising the steps of:
preparing an aqueous dispersion comprising an oxide of a metal other than lithium selected from the group consisting of niobium, aluminum, titanium, zirconium, silicon, tungsten, and mixtures thereof, a water-soluble lithium compound and, optionally, an alkali metal carbonate and/or ammonium carbonate, and
short-term drying the dispersion to obtain the at least partially amorphous lithium-containing powder; wherein neither the dispersion nor the at least partially amorphous powder is subjected to a temperature equal to or above 300° C. for more than 1 min, preferably for more than 30 sec; provided that when the water-soluble lithium compound is lithium hydroxide and ammonium carbonate, but no alkali metal carbonate is added to the dispersion, and the dispersion is dried by spray drying, the metal oxide is not aluminum oxide.

In a ninth aspect the present invention relates to a method of making an at least partially amorphous lithium-containing powder, comprising the steps of:
preparing an aqueous dispersion comprising a pyrogenically produced oxide of a metal other than lithium selected from the group consisting of niobium, aluminum, titanium, zirconium, silicon, tungsten, and mixtures thereof, a water-soluble lithium compound and, if the water-soluble compound is not lithium carbonate, an alkali metal carbonate and/or ammonium carbonate, and
spray drying the dispersion to obtain the at least partially amorphous lithium-containing powder; wherein neither the dispersion nor the at least partially amorphous powder is subjected to a temperature equal to or above 300° C. for more than 1 min, preferably for more than 30 sec; provided that when the water-soluble lithium compound is lithium hydroxide and ammonium carbonate, but no alkali metal carbonate is added to the dispersion, the metal oxide is not aluminum oxide.

In a tenth aspect the present invention relates to the method of the sixth or eighth aspect, wherein the short-term drying is selected from spray drying and spin flash drying, preferably is spray drying.

In an eleventh aspect the present invention relates to the method of the tenth aspect, wherein the dispersion is dried by spray drying and the step of spray drying is carried out using an inlet air temperature of the spray drier of less than 600° C., and an outlet air temperature of from 50° C. to 200° C., preferably of from 80° C. to 150° C., and more preferably of from 90° C. to 140° C.

In a twelfth aspect the present invention relates to the method of any of the sixth to eleventh aspect, wherein the water-soluble lithium compound is selected from the group consisting of lithium hydroxide, lithium oxide, lithium carbonate, lithium bicarbonate, lithium oxalate, lithium acetate, lithium formate, lithium nitrate, lithium chloride, lithium bromide, lithium sulfate, lithium perchlorate, and mixtures thereof.

In a thirteenth aspect the present invention relates to the method of any of the sixth to twelfth aspect, wherein the amount of the water-soluble lithium compound in the dispersion ranges from 0.1 to 10 wt.-%, preferably from 0.5 to 7.5 wt.-%, based on the total weight of the dispersion.

In a fourteenth aspect the present invention relates to the method of any of the sixth to thirteenth aspect, wherein, if present, the amount of alkali metal carbonate and/or ammonium carbonate in the dispersion ranges from 0.1 to 10 wt.-%, preferably from 0.5 to 7.5 wt.-%, based on the total weight of the dispersion.

In a fifteenth aspect the present invention relates to the method of any of the sixth to fourteenth aspect, wherein the amount of the oxide of a metal other than lithium selected from the group consisting of niobium, aluminum, titanium, zirconium, silicon, tungsten, and mixtures thereof in the dispersion ranges from 0.5 to 20 wt.-%, preferably from 1.0 to 10 wt.-%, based on the total weight of the dispersion.

In a sixteenth aspect the present invention relates to the method of any of the sixth to fifteenth aspect, wherein the specific surface area of the oxide of a metal other than lithium selected from the group consisting of niobium, aluminum, titanium, zirconium, silicon, tungsten, and mixtures thereof ranges of from 10 $m^2$/g to 500 $m^2$/g, preferably of from 50 $m^2$/g to 250 $m^2$/g, more preferably of from 70 $m^2$/g to 200 $m^2$/g, as determined by the BET method.

In a seventeenth aspect the present invention relates to the method of any of the preceding aspects, wherein neither the at least partially amorphous powder nor the transition metal oxide coated with said powder are subjected to a temperature equal to or above 300° C. for more than 1 min, preferably for more than 30 sec.

In an eighteenth aspect the present invention relates to the method of any of the preceding aspects, wherein the at least partially amorphous powder is used in an amount of from 0.1 to 10 wt.-%, preferably from 0.5 to 5.0 wt.-%, based on the combined weight of the transition metal oxide and the at least partially amorphous powder.

In a nineteenth aspect the present invention relates to the method of any of the preceding aspects, wherein the specific surface area of the at least partially amorphous powder ranges of from 20 to 300 m$^2$/g, preferably from of 35 to 250 m$^2$/g, more preferably of from 50 to 200 m$^2$/g, and most preferably of from 100 to 200 m$^2$/g, as determined by the BET method. The specific surface area can be determined according to DIN 9277:2014 by nitrogen adsorption according to Brunauer-Emmett-Teller (BET) procedure.

In a twentieth aspect the present invention relates to an at least partially amorphous lithium-containing powder, comprising an oxide of a metal other than lithium selected from the group consisting of niobium, aluminum, titanium, zirconium, silicon, tungsten, and mixtures thereof, made by the method of any of the eighth to nineteenth aspect.

In a twenty-first aspect the present invention relates to a transition metal oxide coated with an at least partially amorphous lithium-containing powder, comprising an oxide of a metal other than lithium selected from the group consisting of niobium, aluminum, titanium, zirconium, silicon, tungsten, and mixtures thereof.

In a twenty-second aspect the present invention relates to the coated transition metal oxide of the twenty-first aspect, wherein the transition metal oxide is a mixed transition metal oxide selected from the group consisting of lithium cobalt oxides (LCO), lithium nickel oxides (LNO), lithium manganese oxides (LMO), mixed lithium nickel-cobalt oxides (LNCO), mixed lithium nickel-manganese-cobalt oxides (NMC), mixed lithium nickel-manganese oxides (LNMO), mixed lithium nickel-cobalt-aluminum oxides (NCA) or mixtures thereof, and preferably is a mixed lithium nickel-manganese-cobalt oxide (NMC).

In a twenty-third aspect the present invention relates to the coated transition metal oxide of the twenty-first or twenty-second aspect, wherein the at least partially amorphous lithium-containing coating is formed from a powder, preferably a powder as defined in any of the third to fifth and/or twentieth aspects.

In a twenty-fourth aspect the present invention relates to the coated transition metal oxide of any of the twenty-first to twenty-third aspects made by the method of any of the first to seventh or tenth to nineteenth aspects.

In a twenty-fifth aspect the present invention relates to an electrode or electrolyte comprising the coated transition metal oxide according to any of the twenty-first to twenty-fourth aspects.

In a twenty-sixth aspect the present invention relates to an energy-storage device comprising the coated transition metal oxide according to any of the twenty-first to twenty-fourth aspects or the electrode or electrolyte of the twenty-fifth aspect.

In a twenty-seventh aspect the present invention relates to the energy-storage device of the twenty-sixth aspect, wherein the device is a lithium-ion battery, preferably a solid-state type battery, more preferably a sulfide based solid-state type battery.

In a twenty-eighth aspect the present invention relates to use of the transition metal oxide according to any of the twenty-first to twenty-fourth aspects for improving the discharge capacity of an energy-storage device in comparison to the same energy-storage device comprising a transition metal oxide coated with a lithium-containing powder, which was calcinated before coating.

EXAMPLES

Preparation of the Material for Coating the Transition Metal Oxide (Step I)

Comparative Example 1

A pyrogenic niobium oxide particle was produced by a pyrogenic process according to DE 4102328 A1. Therefore, 430 g/h NbCl$_5$, 180 l/h H$_2$, 400 l/h N$_2$ and 4.1 m$^3$/h air were premixed and the resulting gas mixture was continuously burnt in a burner. The burner was connected to a flame tube, a cooling coil and a filter to separate the particles. The particles were treated with steam at 600° C. to remove HCl physiosorbed on the surface. Physicochemical properties of the resulting product are shown in Table 1.

Example 2

60 Grams of a pyrogenic niobium oxide (as obtained in Example 1) were dispersed in a solution of 23 g (NH$_4$)$_2$CO$_3$ in 875 ml water and the resulting dispersion was stirred for 30 minutes. A solution of 19 g LiOH monohydrate in 280 ml deionized water was added slowly, and the resulting dispersion was additionally stirred for 30 minutes. This dispersion was spray-dried with a product residence time of 30 seconds in the drying chamber on a laboratory spray drier (inlet air temperature of 200° C., outlet air temperature of 130° C.) (Büchi T0630). Physicochemical properties of the resulting product are shown in Table 1.

Comparative Example 3

The obtained powder from the Example 2 was subjected to calcination at 550° C. for 6 h. Physicochemical properties of the resulting product are shown in Table 1.

Comparative Example 4

Pyrogenic aluminum oxide powder was produced by a flame process according to U.S. Pat. No. 7,749,322 B2. Physicochemical properties of the resulting product are shown in Table 1.

Example 5

3000 Grams of the commercially available pyrogenic aluminum oxide AEROXIDE® Alu 130 (manufactured by Evonik Industries AG) were dispersed in a solution of 2969 g (NH$_4$)$_2$CO$_3$ in 43 L deionized water and the resulting dispersion was stirred for 15 minutes. A solution of 2469 g LiOH·H$_2$O in 14 L deionized water was added and the resulting dispersion was stirred for 30 minutes. This dispersion was spray-dried with a product residence time of 60 seconds in the drying chamber on a pilot plant spray drier (inlet air temperature of 450° C., outlet air temperature of 105° C.). Physicochemical properties of the resulting product are shown in Table 1.

Example 6

100 Grams of a pyrogenic aluminum oxide having a BET surface of 221 m²/g (manufactured by Evonik Industries AG) were dispersed in a solution of 99 g $(NH_4)_2CO_3$ in 1450 g deionized water and the resulting dispersion was stirred for 30 minutes. A solution of 83 g LiOH $H_2O$ in 469 g deionized water was added and stirred for 30 minutes. Additionally, 700 ml deionized water were added to lower the viscosity. This dispersion was spray-dried with a product residence time of 30 seconds in the drying chamber on a laboratory spray drier (inlet air temperature of 200° C., outlet air temperature of 130° C.) (Büchi T0630). Physicochemical properties of the resulting product are shown in Table 1.

Comparative Example 7

The obtained powder from the Example 5 was subjected to calcination at 600° C. for 6 h. Physicochemical properties of the resulting product are shown in Table 1.

Comparative Example 8

The obtained powder from the example 6 was subjected to calcination at 600° C. for 6 h. Physicochemical properties of the resulting product are shown in Table 1.

TABLE 1

Physicochemical properties of the powders obtained in Examples 1 to 8 (Step I).

| Example | BET [m²/g] | The main crystallographic phase (XRD) |
|---|---|---|
| Example 1 (Comp.) | 84 | Orthorhombic $Nb_2O_5$ |
| Example 2 | 58 | $Nb_2O_5/Li_2CO_3$ |
| Example 3 (Comp.) | 29 | Hexagonal $LiNbO_3$ |
| Example 4 (Comp.) | 130 | $\delta$-$Al_2O_3$ |
| Example 5 | 67 | $Al_2O_3/Li_2CO_3$ |
| Example 6 | 124 | $Al_2O_3/Li_2CO_3$ |
| Example 7 (Comp.) | 59 | $\alpha$-$LiAlO_2/Li_2CO_3$ |
| Example 8 (Comp.) | 56 | $\alpha$-$LiAlO_2/\gamma$-$LiAlO_2$ |

Coating of the Transition Metal Oxide (Step II)

Lithium-nickel-manganese-cobalt mixed (NMC) oxide powder NMC811 commercially available from GELON ENERGY CORP. (Linyi, China) having a BET surface area of 0.45 to 0.70 m²/g and a diameter $d_{50}$=4.5±1.5 μm (determined by laser scattering method) was used as the transition metal oxide in the following Examples.

The NMC powder was mixed with the respective amount (1.0 wt.-%) of the powders obtained in Examples 1 to 8 (Step I) in a high intensity laboratory mixer (SOMAKON mixer MP-GL with 0.5 L mixing unit) at first for 1 min at 500 rpm to homogeneously mix the two powders. Afterwards, the mixing intensity was increased to 2000 rpm for 5 min to achieve the dry coating of the NMC powder by the respective powders obtained in Examples 1 to 8 (Step I).

Electrochemical tests of lithium-ion batteries with sulfide based all-solid-state batteries A powdered composite electrode was prepared by mixing the coated NMC (obtained in Step II of the Examples above), conductive carbon additive carbon nanofibers (CNF), and solid electrolyte (Li6PS5Cl, SE) in the mass ratio of 63:2:35 for 30 min in an agate mortar. To fabricate a free-standing and flexible dry film, the above prepared powder electrode was mixed with 0.3 wt.-% of polytetrafluoroethylene (PTFE, emulsion polymerized fine powder; particle size 300 to 700 μm; softening point 320 to 330° C.; molecular weight 107 to 108 g/mol) in a mortar at 100° C.

After 1 min of mixing and shearing, a single flake was formed. The flake was placed on a hot plate and rolled out to the desired thickness (=100 μm). Each sample was prepared at least twice to confirm the reproducibility of the process. To prepare a free-standing electrolyte film, the solid electrolyte was mixed with 0.15 wt.-% of PTFE and treated in the same way as the cathode film.

A test cell was prepared for measuring the basic characteristics of the cathode composite, such as the charge/discharge potential profiles, rated discharge capability.

The cell was prepared using a die with a diameter of 13 mm. The test cell comprised a stainless-steel outer casing with a Teflon insulator. For a typical cell, the electrolyte Li6PS5Cl powder was uniformly spread inside the die by a micro-spatula. Next, the powder was once temporally compressed (300 MPa) and compacted into a pellet. The cathode composite powder was homogeneously distributed across the compacted electrolyte surface in the die. Then the cathode layer was compressed. On the opposite side of the cell stack, a lithium-indium alloy anode was placed and compressed. All the cell components were again compressed together and completely pelletized by using a hydraulic press (4 tons for 30 s were applied; resulting in a pressure of 300 MPa).

After compression, the cell stack was placed inside the outer steel casing, where a screw maintained the electric contact in the cell. The screw was fastened at 3.0 Nm using a preset torque.

All above mentioned processes were carried out in an Ar filled glove box (<0.1 ppm $H_2O$ and $O_2$). The cycle and rate performances of the cell were measured using a battery tester CTS-Lab (BaSyTec, Asselfingen, Germany). The standard rate performance test plan consisted of 3 different discharge currents ranging from 0.066 mA (0.035C) to 1.4 mA (0.75C) while the charging rate was kept constant at 0.14 mA (0.075C) including a constant voltage (CV) step. The standard cut-off voltages for the cycle test were set at 3.63 V and 1.93 V for charge and discharge, respectively.

TABLE 2

Discharge capacities at 0.75 C (1.4 mA) in sulfide based all-solid-state batteries

| Example | Discharge capacity at 0.75 C in 4$^{th}$ cycle [mAh/g] |
|---|---|
| Example 1 (Comp.) | 125.7 |
| Example 2 | 144.9 |
| Example 3 (Comp.) | 125.0 |
| Example 4 (Comp.) | 79.4 |
| Example 5 | 120.9 |
| Example 6 | 139.7 |
| Example 7 (Comp.) | 105.0 |
| Example 8 (Comp.) | 119.7 |

It has surprisingly been found that the discharge capacity at 0.75C in 4$t^{th}$ cycle can be improved by using a transition metal oxide coated with an at least partially amorphous lithium-containing powder obtained in step I of inventive Examples 2, 5 and 6 when compared to the same transition metal oxide coated with either the calcinated powder or the fumed metal oxide itself.

Figure 2:
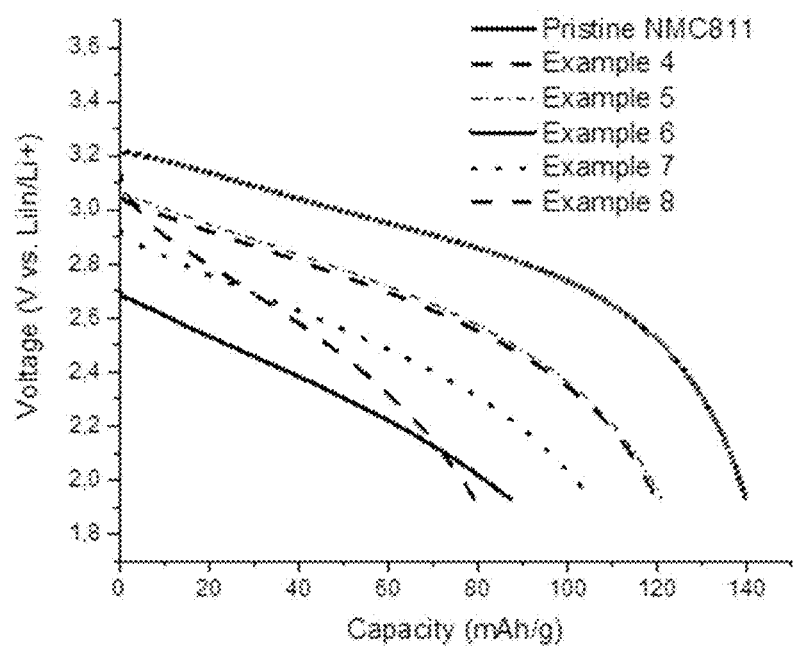
FIG. 2 shows the discharge curves (voltage over capacity) at the 4th cycle at a discharge current of 1.4 mA (0.75C) for aluminum-based coating materials in sulfide-based all-solid-state batteries with a solid electrolyte of Li6PS5Cl.
Figure 3:
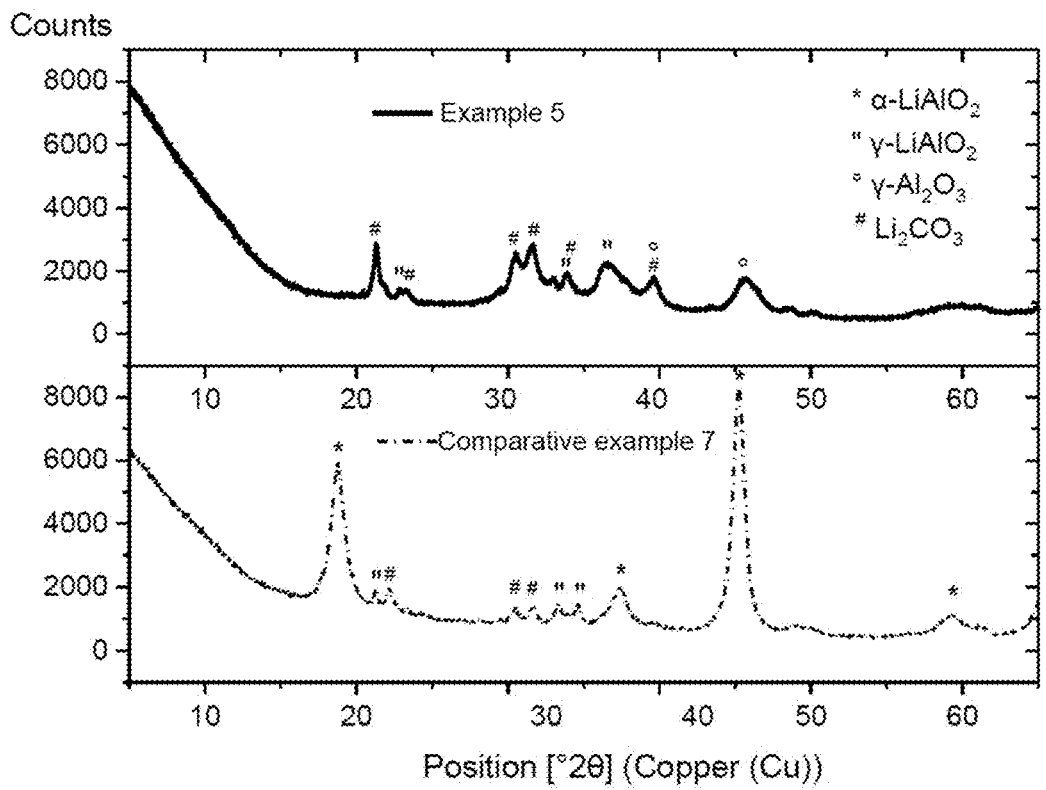
FIG. 3 shows XRPD spectra of an amorphous powder obtained in Example 5 (Step I) and a calcinated powder obtained in Comparative Example 7 (Step I). The samples were analyzed on the X'Pert MPD Pro diffractometer from PANalytical in Bragg-Brentano geometry.

This can also be seen in FIGS. 1 and 2. The influence of niobium-based coating layers on the rate characteristics at the discharge current 1.4 mA (0.75C) at the 4$^{th}$ cycle is shown in FIG. 1. The discharge capacities of NMC dry coated with either fumed $Nb_2O_5$ powder (Comp. Example 1), a partially amorphous lithium-containing powder, comprising $Nb_2O_5$, $Li_2CO_3$ and LiOH (Example 2) or calcinated $LiNbO_3$ powder (Comp. Example 3) at 1.4 mA are compared with that of the uncoated NMC as a reference. It can be readily recognized from the shown graphs, that the dry coated partially amorphous lithium-containing powder coating of Example 2 significantly improves the discharge capacity of NMC in sulfide-based all-solid-state batteries, when compared to a coating with either a fumed metal oxide (Comp. Example 1) or a calcinated lithium niobium oxide (Comp. Example 3).

FIG. 2 shows the influence of Al based coating layers on the rate characteristics at the discharge current 1.4 mA (0.75C) at the $4^{th}$ cycle. The discharge capacities of NMC dry coated with either a fumed aluminum oxide AEROXIDE® Alu 130 powder (Comp. Example 4), a partially amorphous lithium-containing powder comprising $Al_2O_3$, Li2CO$_3$ and LiOH (Examples 5 and 6) or a calcinated $LiAlO_2$ powder (Comp. Examples 7 and 8) at 1.4 mA are compared with that of the uncoated NMC as a reference. It can be readily recognized from the shown graphs, that the dry coated partially amorphous lithium-containing powder coating of inventive Examples 5 and 6 improves the discharge capacity of NMC in sulfide-based all-solid-state batteries compared to the calcinated lithium aluminate (Comp Examples 7 and 8) or fumed aluminum oxide (Comp. Example 4). In addition, when comparing inventive Examples 5 and 6 with each other, it had been observed that a partially amorphous lithium-containing powder coating with a higher specific surface area significantly improves the discharge capacity of NMC in sulfide based all-solid-state batteries.

Example 9

Preparation of the Material for Coating the Transition Metal Oxide for Investigation in Liquid Lithium Ion Batteries The commercial NMC 7 1.5 1.5-powder (Linyi Gelon LIB Co., Type PLB-H7) with a BET surface area of 0.30-0.60 m$^2$/g, medium diameter d50=10.6±2 μm (via laser scattering), was mixed with the respective amount (1.0 wt %) of the partially amorphous lithium-containing powder comprising aluminum oxide AEROXIDE® Alu 130, $Li_2CO_3$ and LiOH (Example 5) in a high intensity laboratory mixer (SOMAKON mixer MP-GL with 0.5 L mixing unit) at first for 1 min at 500 rpm to homogeneously mix the two powders. Afterwards the mixing intensity was increased to 2000 rpm for 5 min to achieve the dry coating of the NMC particles by the partially amorphous lithium-containing powder comprising aluminum oxide AEROXIDE® Alu 130, $Li_2CO_3$ and LiOH (Example 5).

Coated NMC particles are achieved with a partially amorphous lithium-containing powder comprising aluminum oxide AEROXIDE® Alu 130, $Li_2CO_3$ and LiOH-coating layer thickness of 20-200 nm. Afterwards, the coated NMC 7 1.5 1.5-powder is sintered for 8 h at 600° C. in oxygen atmosphere.

Electrochemical Tests of Lithium Ion Batteries with Liquid Electrolyte

Electrodes for electrochemical measurements were prepared by blending 90 wt % NMC with 5 wt % PVDF (Solef PVDF 5130) as a binder and 5 wt % SUPER C65 (IMERYS) as a conductive additive under inert gas atmosphere. N-Methyl-2-pyrrolidone (NMP) was used as the solvent. The slurry was casted on aluminum foil and dried for 20 min on 120° C. heating plate in air. Afterward, the electrode sheet was dried in a vacuum furnace at 120° C. for 2 h. The area-related cathode loading is adjusted to 2.0±0.1 mAh cm$^{-2}$. Circular electrodes with a diameter of 12 mm were punched out, calendered to achieve an electrode density of 3.0 g cm$^{-3}$, and dried again in a vacuum furnace at 120° C. for 12 h to remove any residual water and NMP. For the cycling tests the cells were assembled as CR2032 type coin cells (MTI Corporation) in an argon-filled glovebox (GLOVEBOX SYSTEMTECHNIK GmbH). Lithium metal (ROCKWOOD LITHIUM GmbH) is used as the anode material. Celgard 2500 was used as the separator. 35 μL of a solution of 1 molar $LiPF_6$ in ethylene carbonate and ethyl methyl carbonate (50:50 wt/wt; SIGMA-ALDRICH) was used as electrolyte. The cells were locked with a crimper (MTI).

For electrochemical evaluations galvanostatic cycling was performed between 3.0 and 4.3 V vs Li$^+$/Li at 25° C. For the calculation of the capacities and the specific currents, only the mass of the active material was considered and a theoretical capacity of 180 mAh/g of NMC 7 1.5 1.5 is supposed. For the coin half-cells during cycling, the C-rate was increased every four cycles, starting from 0.1/0.1 (Charge/Discharge) to 0.2/0.2, 0.5/0.5, 1.0/1.0 and 1.0/2.0 C. Afterward, the cell was cycled at 1/1 C for long term stability test.

Figure 4:
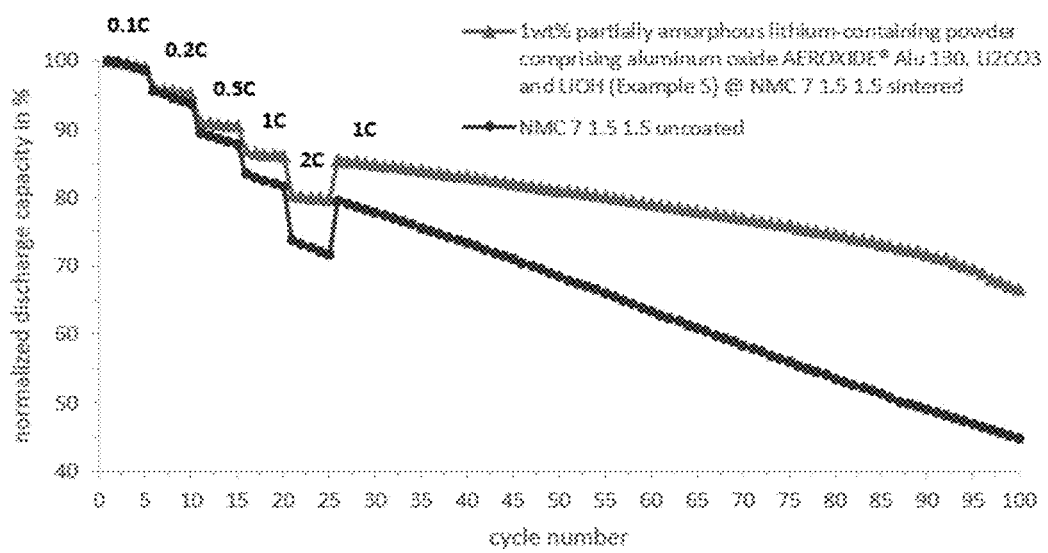
FIG. 4 shows the influence of the partially amorphous lithium-containing powder comprising aluminum oxide AEROXIDE® Alu 130, Li2CO3 and LiOH on the cycling performance in liquid lithium ion batteries after it has been coated on NMC cathode material by simple dry mixing and subsequently sintered. The performance of NMC coated by the partially amorphous lithium-containing powder comprising aluminum oxide AEROXIDE® Alu 130, Li2CO3 and LiOH is compared against the uncoated NMC.

FIG. 4 shows the influence of the received partially amorphous lithium-containing powder comprising aluminum oxide AEROXIDE® Alu 130, $Li_2CO_3$ and LiOH (Example 5)-coating layer on the cycling performance in liquid lithium ion batteries. The performance of NMC coated by partially amorphous lithium-containing powder comprising aluminum oxide AEROXIDE® Alu 130, $Li_2CO_3$ and LiOH (Example 5) and subsequently sintered is compared against the uncoated NMC. From the graph data, it can be intuitively concluded that the received coating improves the performance and cycle life of NMC significantly. The coated NMC shows an improved rate capability and long-term cycling stability.

All references cited herein are fully incorporated by reference. Having now fully described the invention, it will be understood by one of skill in the art that the invention may be performed within a wide and equivalent range of conditions, parameters and the like, without affecting the spirit or scope of the invention or any embodiment thereof.

The invention claimed is:

1. A method for making a transition metal oxide coated with an at least partially amorphous lithium-containing coating, comprising the step of dry mixing:
    a transition metal oxide;
    an at least partially amorphous powder comprising lithium; and
    an oxide of a metal other than lithium, selected from the group consisting of: niobium; aluminum; titanium; zirconium; silicon; tungsten; and mixtures thereof.

2. The method of claim 1, wherein the transition metal oxide is a mixed transition metal oxide selected from the group consisting of: lithium cobalt oxides (LCO); lithium nickel oxides (LNO); lithium manganese oxides (LMO); mixed lithium nickel-cobalt oxides (LNCO); mixed lithium nickel-manganese-cobalt oxides (NMC); mixed lithium nickel-manganese oxides (LNMO); mixed lithium nickel-cobalt-aluminum oxides (NCA); and mixtures thereof.

3. The method of claim 2, wherein the at least partially amorphous powder comprises a lithium metal oxide, wherein the metal is selected from the group consisting of: niobium, aluminum, titanium, zirconium, silicon, tungsten, and mixtures thereof; alone or as a mixture with lithium carbonate or lithium hydroxide.

4. The method of claim 3, wherein the specific surface area of the at least partially amorphous powder ranges from 10 to 300 m$^2$/g as determined by the BET method.

5. The method of claim 3, wherein the specific surface area of the at least partially amorphous powder ranges from 50 to 200 m$^2$/g as determined by the BET method.

6. The method of claim 5, further comprising the subsequent step of sintering the transition metal oxide coated with an at least partially amorphous lithium-containing coating at temperatures between 10° and 900° C.

7. The method of claim 1, wherein the transition metal oxide is a mixed lithium nickel-manganese-cobalt oxide (NMC).

8. The method of claim 1, wherein the at least partially amorphous powder comprises a lithium metal oxide, wherein the metal is selected from the group consisting of: niobium, aluminum, titanium, zirconium, silicon, tungsten, and mixtures thereof; alone or as a mixture with lithium carbonate or lithium hydroxide.

9. The method of claim 1, wherein the specific surface area of the at least partially amorphous powder ranges from 10 to 300 m$^2$/g as determined by the BET method.

10. The method of claim 1, wherein the specific surface area of the at least partially amorphous powder ranges from 100 to 200 m$^2$/g as determined by the BET method.

11. The method of claim 1, wherein the specific surface area of the at least partially amorphous powder ranges from 50 to 200 m$^2$/g as determined by the BET method.

12. The method of claim 1, further comprising the subsequent step of sintering the transition metal oxide coated with an at least partially amorphous lithium-containing coating at temperatures between 100 and 900° C.

13. The method of claim 1, further comprising, prior to the step of dry mixing the transition metal oxide and the at least partially amorphous lithium-containing powder, the steps of:
  preparing an aqueous dispersion comprising an oxide of a metal other than lithium, selected from the group consisting of: niobium, aluminum, titanium, zirconium, silicon, tungsten, and mixtures thereof, a water-soluble lithium compound and, optionally, an alkali metal carbonate and/or ammonium carbonate; and
  short-term drying the dispersion to obtain the at least partially amorphous lithium-containing powder.

14. An electrode or electrolyte comprising the coated transition metal oxide of claim 1.

15. The electrode or electrolyte of claim 14, wherein the transition metal oxide is a mixed transition metal oxide selected from the group consisting of: lithium cobalt oxides (LCO); lithium nickel oxides (LNO); lithium manganese oxides (LMO); mixed lithium nickel-cobalt oxides (LNCO); mixed lithium nickel-manganese-cobalt oxides (NMC); mixed lithium nickel-manganese oxides (LNMO); mixed lithium nickel-cobalt-aluminum oxides (NCA); and mixtures thereof.

16. The electrode or electrolyte of claim 15, wherein the at least partially amorphous powder comprises a lithium metal oxide, wherein the metal is selected from the group consisting of: niobium, aluminum, titanium, zirconium, silicon, tungsten, and mixtures thereof; alone or as a mixture with lithium carbonate or lithium hydroxide.

17. A method for making an at least partially amorphous lithium-containing powder, comprising the steps of:
  a) preparing an aqueous dispersion comprising:
   i) an oxide of a metal other than lithium, selected from the group consisting of: niobium, aluminum, titanium, zirconium, silicon, tungsten, and mixtures thereof;
   ii) a water-soluble lithium compound; and
   iii) optionally an alkali metal carbonate and/or ammonium carbonate,
   and
  b) short-term drying the dispersion to obtain the at least partially amorphous lithium-containing powder;
wherein neither the dispersion nor the at least partially amorphous powder is subjected to a temperature equal to or above 300° C. for more than 1 min;
with the proviso that, when the water-soluble lithium compound is lithium hydroxide, and ammonium carbonate, but no alkali metal carbonate is added to the dispersion, and the dispersion is dried by spray drying, the metal oxide is not aluminum oxide.

18. The method of claim 17, wherein the short-term drying is by spray drying or spin flash drying.

19. The method of claim 17, wherein:
  a) the amount of the water-soluble lithium compound in the dispersion ranges from 0.1 to 10 wt.-% based on the total weight of the dispersion;
  b) if present, the amount of alkali metal carbonate and/or ammonium carbonate in the dispersion ranges from 0.1 to 10 wt.-%, based on the total weight of the dispersion; and
  c) the amount of the oxide of a metal other than lithium, selected from the group consisting of niobium, aluminum, titanium, zirconium, silicon, tungsten, and mixtures thereof in the dispersion ranges from 0.5 to 20 wt.-% based on the total weight of the dispersion.

20. The method of claim 17, wherein:
  a) the amount of the water-soluble lithium compound in the dispersion ranges from 0.5 to 7.5 wt.-% based on the total weight of the dispersion;
  b) if present, the amount of alkali metal carbonate and/or ammonium carbonate in the dispersion ranges from 0.5 to 7.5 wt.-% based on the total weight of the dispersion; and
  c) the amount of the oxide of a metal other than lithium, selected from the group consisting of niobium, aluminum, titanium, zirconium, silicon, tungsten, and mixtures thereof in the dispersion ranges from 1.0 to 10 wt.-% based on the total weight of the dispersion.

* * * * *